Patented Oct. 31, 1944

2,361,787

UNITED STATES PATENT OFFICE 2,361,787

MANUFACTURE OF LUBRICATING OILS

John M. Musselman, South Euclid, Ohio, assignor to The Standard Oil Company, Cleveland, Ohio, a corporation of Ohio No Drawing. Application September 24, 1940, Serial No. 358,147

1 Claim. (Cl. 196—40)

Lubricating oils as used in internal combustion engines have the drawback of forming undesirable amounts of deposited lacquer and asphaltic precipitate; and various addition agents have been employed in an effort to reduce such formation. I have now found that a particular source of such deposited matters is dissolved substances which remain in the oil from sulphuric acid refining. Being in solution, such materials are normally undetected, and the existence of this prolific cause of deposits has been unrecognized.

In accordance with the present invention, materials of this character may be eliminated and lubricating oils of correspondingly better properties in high temperature usage may be had.

To the accomplishment of the foregoing and related ends, the invention, then, comprises the features hereinafter fully described, and particularly pointed out in the claims, the following description setting forth in detail certain illustrative embodiments of the invention, these being indicative, however, of but a few of the various ways in which the principle of the invention may be employed.

The lubricating stock may be any of the customary stocks for lubricating oil production and, for instance, of Mid-Continent source, and of viscosity as desired in any given instance. The stock is treated with sulphuric acid, along customary lines, the concentration of the acid depending upon the particular stock and usage intended. In customary practice, 66° Bé. acid, for instance, is generally used, and in amount of 5–60 pounds per barrel, and the oil is agitated about 15–30 minutes, allowed to settle for a short time, up to five or six hours, then the sludge is withdrawn, and the oil may be finally subjected to clay treatment, percolation or contact and filtration. I have found that such oil, although of excellent appearance and free from detectable deposit matter, if now subjected to a settling treatment at ordinary temperature for at least twenty-four hours, develops a very fine floc in the oil. This is not very prominent, and it does not settle out on standing. If the oil be heated, it goes back into solution. If the oil is subjected to filtration while cold, this fine floc is sufficient to plug the filter in a very short run. Oil treated by the customary acid procedure and sludge-separated as usual either by agitator or by centrifuging, carries through such trouble-making material, although of good appearance and acceptable test. In accordance with the present invention this material normally left in the oil, and in fact undetected, is removed by special procedure. In the present invention, the oil after treatment with sulphuric acid and separation of the sludge as completely as possible by usual means, is subjected to a special settling, involving a considerable time interval and with avoidance of raised temperature, that is at ordinary or low temperature condition and inducing fine floc formation, then this is eliminated suitably, as by being subjected to a further treatment of centrifuging. The oil may then be neutralized with soda solution or may be clay treated, or both if desired.

Advantageously, before the prolonged settling or after the sludge separation and before the centrifuging, a carefully controlled amount of water is mixed into the stock, this being less than such as used in instances where water has been added for raw sludge coagulation, and for the present practice the amount of water should not exceed 0.1–0.2 per cent. The stock being then settled for 24–72 hours, desirably 48 hours, or in any case a sufficient length of time, depending upon the particular stock, on passing through centrifuges, the flocculent acidic material formed is separated out.

Oil treated in accordance with the present process is characterized by marked lowering of the acid number as compared with oil not undergoing the treatment here involved.

Thus, a 300 Red stock from Mid-Continent petroleum, treated with 10 pounds per barrel of 66° Bé. sulphuric acid, and settled as in ordinary practice for five hours, showed an acid number 2.20 and after clay contacting S. E. No. 120 and asphalt 1.5 per cent as determined by the Becker oxidation test. On the other hand, in contrast, this oil then treated in accordance with the present invention, 0.1 per cent of water being added and the stock being allowed to settle for 48 hours, and then being centrifuged, showed an acid number 0.80, and after clay contacting S. E. No. 60, and asphalt a trace.

The contrast between oils treated by the customary practice, and, by the present process, is illustrated for instance in comparative tests run on a 1939 Chevrolet motor operating at 3200

R. P. M. under full load, with jacket temperature 203° F. and sump temperature 290° F., each run being for a standard period of 20 hours continuous operation. The oil, S. A. E. 20, in each instance, showed the following results, respectively:

|  | S. A. E. 20 from customary refining treatment | S. A. E. 20 from present process |
|---|---|---|
| Viscosity increase | 340 s. S. U | 250 s. S. U. |
| Sludge | 8.00% | 3.00%. |
| Lacquer on pistons | 175 mg | 120 mg. |
| Piston rating | 10.0 | 8.5. |
| Pistons seized | All | None. |
| Scoring | Marked | Do. |
| Sludge on motor parts | Bad | Good. |

Other modes of applying the principle of the invention may be employed, change being made as regards the details described, provided the features stated in the following claim, or the equivalent of such, be employed.

I therefore particularly point out and distinctly claim as my invention:

A process of making lubricating oils, which comprises subjecting uncracked lubricating oil stock to at least five pounds per barrel of sulphuric acid and agitating, separating out all the sludge that can be separated, then reducing the acid number of the lubricating stock by adding 0.1–0.2 per cent of water and settling the stock for twenty-four to seventy-two hours.

JOHN M. MUSSELMAN.